United States Patent [19]
Friedman et al.

[11] Patent Number: 5,937,996
[45] Date of Patent: Aug. 17, 1999

[54] VIBRATING SCREW FEEDER

[75] Inventors: Daniel Friedman, Edison; Richard C. Wahl, Essex Falls, both of N.J.

[73] Assignee: Vibrascrew Inc., N.J.

[21] Appl. No.: 09/006,450

[22] Filed: Jan. 13, 1998

[51] Int. Cl.$^6$ .................................. B65G 47/19
[52] U.S. Cl. ..................... 198/533; 198/550.01
[58] Field of Search .................. 198/550.01, 550.1, 198/550.6, 533, 670, 671; 222/196, 233, 413

[56] References Cited

U.S. PATENT DOCUMENTS 5,154,326 10/1992 Chang et al. ..................... 198/533 X
5,160,016 11/1992 Moksnes ............................. 198/533

*Primary Examiner*—James R. Bidwell
*Attorney, Agent, or Firm*—Anthony J. Casella; Gerald E. Hespos; Ludomir A. Budzyn

[57] ABSTRACT

A vibratory screw feed apparatus is provided for delivering controlled rates of particulate materials. The apparatus includes a double walled plastic trough having an open-topped upper recess. A hopper is removably mounted to the top of the trough for feeding particulate materials into the opened top upper recess. The trough further includes a bottom recess. A vibrator is mounted within the bottom recess. A screw feed assembly extends through the trough for feeding particulate material from the trough.

15 Claims, 6 Drawing Sheets

VIBRATING SCREW FEEDER

BACKGROUND OF THE INVENTION

1. Field of the Invention

The subject invention is directed to a screw feeder for particulate materials.

2. Description of the Prior Art

Many manufacturing processes, such as processes performed in the chemical, pharmaceutical or food industries utilize particulate materials. The particulates may take the form of pellets, flakes, powders or fibers. Efficiency in the manufacturing process requires delivery of these particulates with speed and accuracy.

Particulates present unique product delivery problems that have been considered in industry for many years. More specifically, particulates may interfere with one another and prevent a pure gravitational flow comparable to the gravitational flow of liquids. Screw feeders can transport articulate materials horizontally. However, the rate of flow of particulates through a screw feeder is affected by the rate of flow of particulates into the screw feeder. The prior art includes particular feeders that rely upon vibration to achieve a continuous and accurate flow of the particulates. The vibration causes the separate particles to move relative to one another. This movement substantially prevents or minimizes interference between adjacent particles, and thereby ensures a continuous flow of the particulates.

Manufacturing facilities often change the product being manufactured. These changes can affect the particulate feed system. For example, the required feed rate of the particulates may change. In other situations the particulate itself may be changed. Thus a feeder may be required to deliver pellets at a first feed rate on one day and then may be required to deliver a different particulate at a different rate on the next day. A good quality feed apparatus must be capable of making this transition easily and effectively. Additionally, the feed machines often have to be carefully cleaned between changes from one particulate material to another. For these reasons, it is desirable to provide a feed apparatus that can be disassembled and reassembled quickly and easily to accommodate changes from one particulate to another and to effectively clean the apparatus during those changes.

Many manufacturing processees require a specified weight of a particulate material. The prior art includes a vibratory screw batch feeders. The prior art vibratory screw batch feeder employs the above-described vibrating screw technology to achieve a very efficient flow of particulate materials. Upon delivery of a specified amount of the particulate material, the operation of the feeder is terminated. The particulate material then is moved from the feeder for use in the manufacturing process. Very effective prior art vibratory screw batch feeders operate on a loss-in-weight principle. More particularly, a weighing device is incorporated into the base of the prior art vibratory screw feeder. A sufficient amount of particulate material is placed in the hopper of the feeder. The feeder then is operated, and the weighing apparatus functions to monitor the loss in weight. When the loss in weight equals the specified batch weight, the operation of the vibratory screw feeder is terminated.

A lighter weight feeder can improve the accuracy of loss-in-weight systems. More particularly, a lighter weight feeder will result in a larger proportion of the weight sensed by the scale system being devoted to the weighing of the particulate material. Conversely, a smaller proportion of the sensed weight will be devoted to the light weight feeder. It has been determined by the inventors herein that weighing accuracy can be increased by employing a scale system dedicated more to weighing the material being processed and less to weighing the feed apparatus. A lighter weight feeder also can reduce initial delivery costs and can simplify movement of the feeder at the manufacturing facility.

Government regulations define allowable noise levels in many manufacturing work places. Accordingly, there are advantages to reducing noise produced by any apparatus, including a vibratory screw feed apparatus. Government regulations also specify materials that can be used for various food grade processing applications. In this regard, prior art feeders intended for food grade applications generally cannot be formed from the standard carbon steel that is acceptable for most other applications. Manufacturers of prior art feeders typically have resorted to stainless steel to meet government regulations for food grade applications. Stainless steel feeders typically cost about one-third more than the comparable feeder formed from conventional carbon steel.

A very effective feeder with a wide range of feeding applications is manufactured by Vibra Screw Inc. of Totowa, N.J. under the trademark Versifeeder. The Versifeeder includes a trapezoidally configured metal hopper having a large open top end and small open bottom end. The bottom end of the hopper is removably mounted to a metal trough. A vibratory apparatus is mounted externally of the trough and vibrates the trough and the hopper sufficiently to ensure a continuous gravitational flow of particulate material from the hopper into the trough. A screw feeder is rotatably mounted in the lower portion of the trough and is operative to deliver the particulate material from the trough to an external receptacle.

Despite the commercial acceptance of the Versifeeder, it is desired to make a feed apparatus that is less costly and lighter weight. It also is desired to provide a feed apparatus that very effectively delivers vibrations to the trough and hopper without significantly adding to noise within the work place. It also would be desirable to provide a lighter weight feeder for loss-in-weight batch feeding operations so that the greater proportion of the sensed weight is devoted to the particulate material being fed, thereby increasing accuracy.

SUMMARY OF THE INVENTION

The subject invention is directed to a vibratory screw feed apparatus for efficiently and accurately delivering particulate materials. The apparatus includes a trough for receiving particulate materials, a hopper for delivering particulate materials to the trough, a vibrator assembly for vibrating the trough and the hopper to ensure a continuous flow of particulates into the trough and a screw feed assembly for removing particulates from the trough.

The trough is molded from a thermoplastic material and include a top and a bottom. A plurality of outer walls extend from the top to the bottom and define an outer enclosure for the trough. The trough further includes a plurality of inner walls supported by the outer walls at the top of the trough. The inner walls extend downwardly from the top of the trough in spaced relationship to the outer walls to define an open-topped upper recess for receiving particulates delivered from the hopper. Portions of the inner walls adjacent to top of the trough may define a flared seat for receiving the hopper as explained further herein. Apertures may extend through the inner and outer walls at opposed ends of the trough for accommodating portions of the screw feed assembly and for enabling removal of the particulates from the trough.

The trough may further include a lower recess defined by a plurality of bottom inner walls extending upwardly from the bottom of the trough toward the particulate recess. The walls of the lower recess are in spaced relationship to both the open-topped upper recess and to the outer walls, and define an enclosure for accommodating the vibrator assembly as explained further herein.

The hopper of the apparatus also is formed from plastic and includes a plurality of side walls, a large open top and a small open bottom. The open bottom of the hopper may be tapered inwardly for sitting in closely nested engagement with the outwardly flared regions of the inner walls adjacent the open top of the trough. Thus, the bottom end of the hopper can be seated tightly in the open top of the trough.

The apparatus may further include a seal at the interface of the trough and the hopper. The seal may be a gasket or an O-ring secured to either of the trough or the hopper at their respective interfaces.

The apparatus may further include releasable connections for holding the hopper and the trough in their interengaged disposition. For example, a plurality of latches may be hingedly connected to either the trough or the hopper and may be rotated into latched engagement with the other of the trough and the hopper.

The vibrator assembly is mounted to the trough, and preferably in the lower recess of the trough surrounded by the bottom ends of the outer walls and by the bottom inner walls of the trough. Thus, the vibratory apparatus may be completely concealed from view and protected from inadvertent contact by workers using the apparatus. Furthermore the double wall of the lower recess contributes to noise insulation. The vibrator may be of a known type, and may be operative to deliver vibrations to the trough and to at least the lower end of the hopper. The vibrator may be mounted to a steel plate bent into a substantially U-shape and secured in substantially face-to-face engagement with surfaces of the bottom inner walls directly beneath the upper recess and the screw as explained further herein. Thus, the vibrator causes vibrations to be transmitted to the steel plate which in turn transmits vibrations to the plastic of the trough and to the hopper.

The screw feed assembly includes a generally cylindrical discharge tube extending through a pair of registered apertures in portions of the trough aligned with the upper recess. A screw extends through the discharge tube and substantially across the open-topped upper recess in the trough. A seal is mounted in an opposed pair of registered apertures in the inner and outer side walls of the trough and accommodates a drive shaft that engages with one end of the screw. A motor is mounted externally of the trough and is operatively connected to the drive shaft for rotatably driving the screw. The seal around the drive shaft preferably is adjustable for periodic tightening to ensure effective sealing despite wear due to long term use of the apparatus. Thus, leakage of powdered or particulate material around the drive shaft of the screw can be substantially prevented.

The apparatus of the subject invention may adjustably accommodate different feed rates by adjusting the rate of vibration, by varying the speed of the screw and by replacing one screw with another of different dimensions. The apparatus of the subject invention also is particularly well suited for loss-in-weight batch feeding operations. More particularly, the plastic is relatively light weight as compared to the prior art metallic feeders, and as a result significantly greater weighing accuracies can be achieved. Furthermore, many plastics are suitable for food grade applications and provide significant cost advantages over prior art stainless steel feeders.

DETAILED DESCRIPTION OF THE PREFERRED EMBODIMENT

Figure 1:
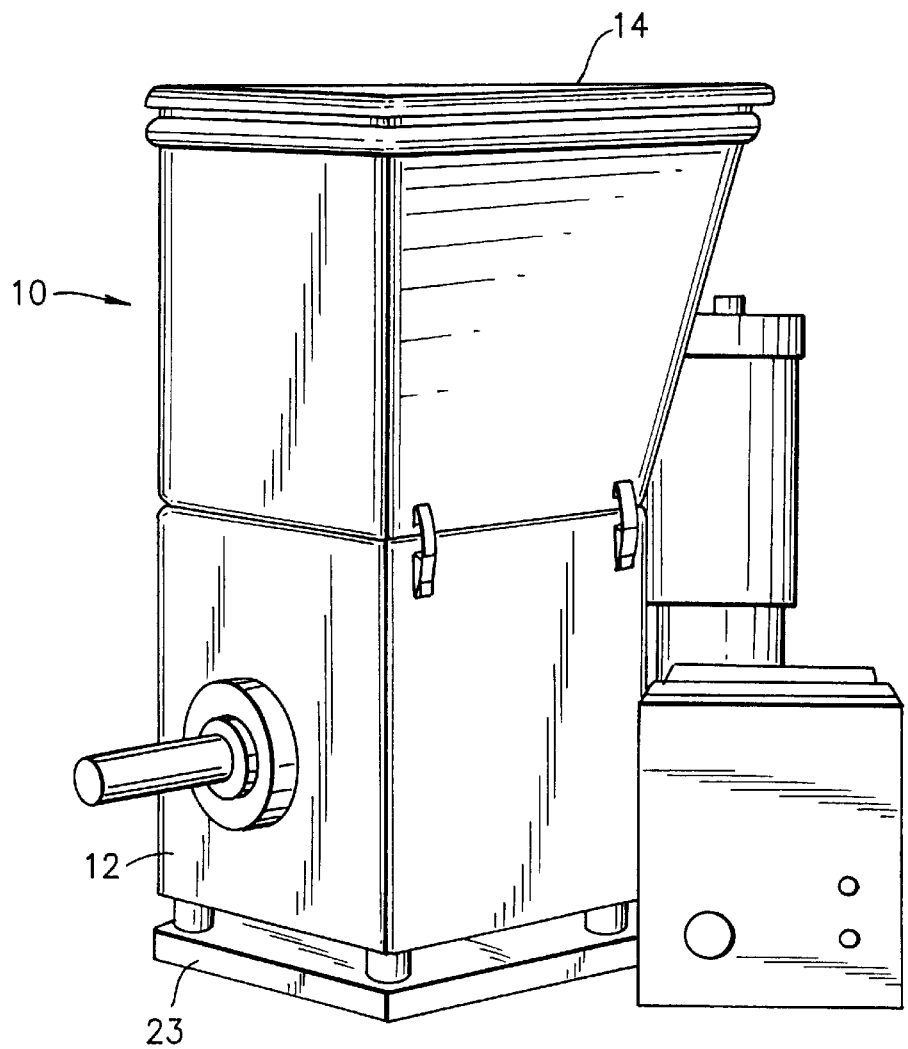
FIG. 1 is a perspective view of an apparatus in accordance with the subject invention.
Figure 7:
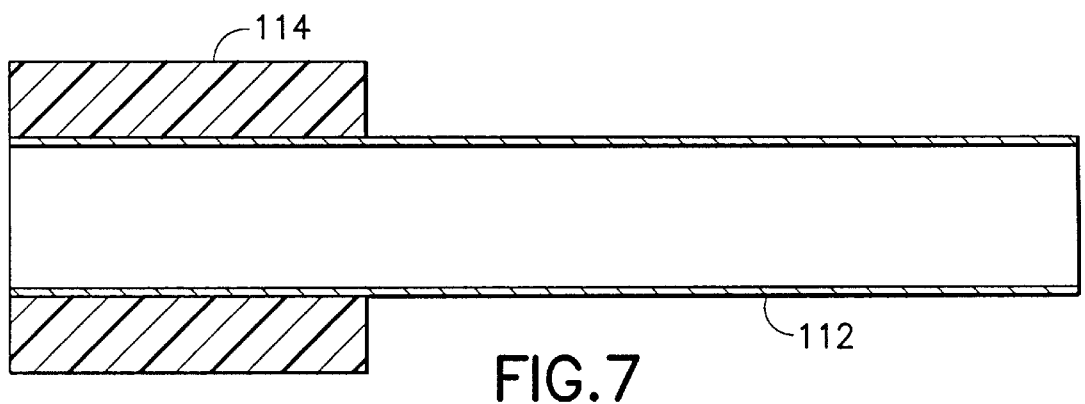
FIG. 7 is a cross-sectional view of the discharge tube assembly.
Figure 2:
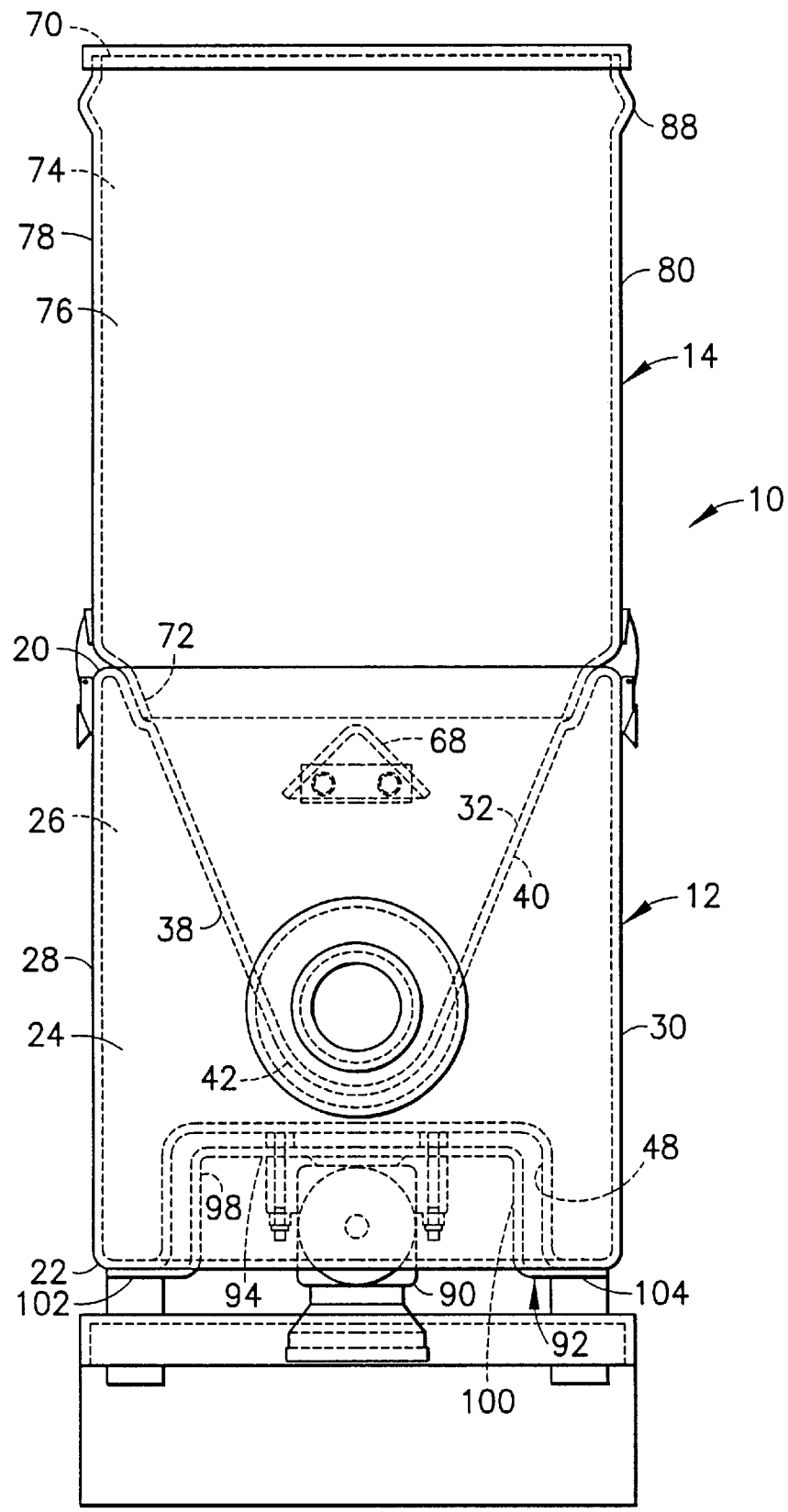
FIG. 2 is an end elevational view of the apparatus shown in FIG. 1.
Figure 3:
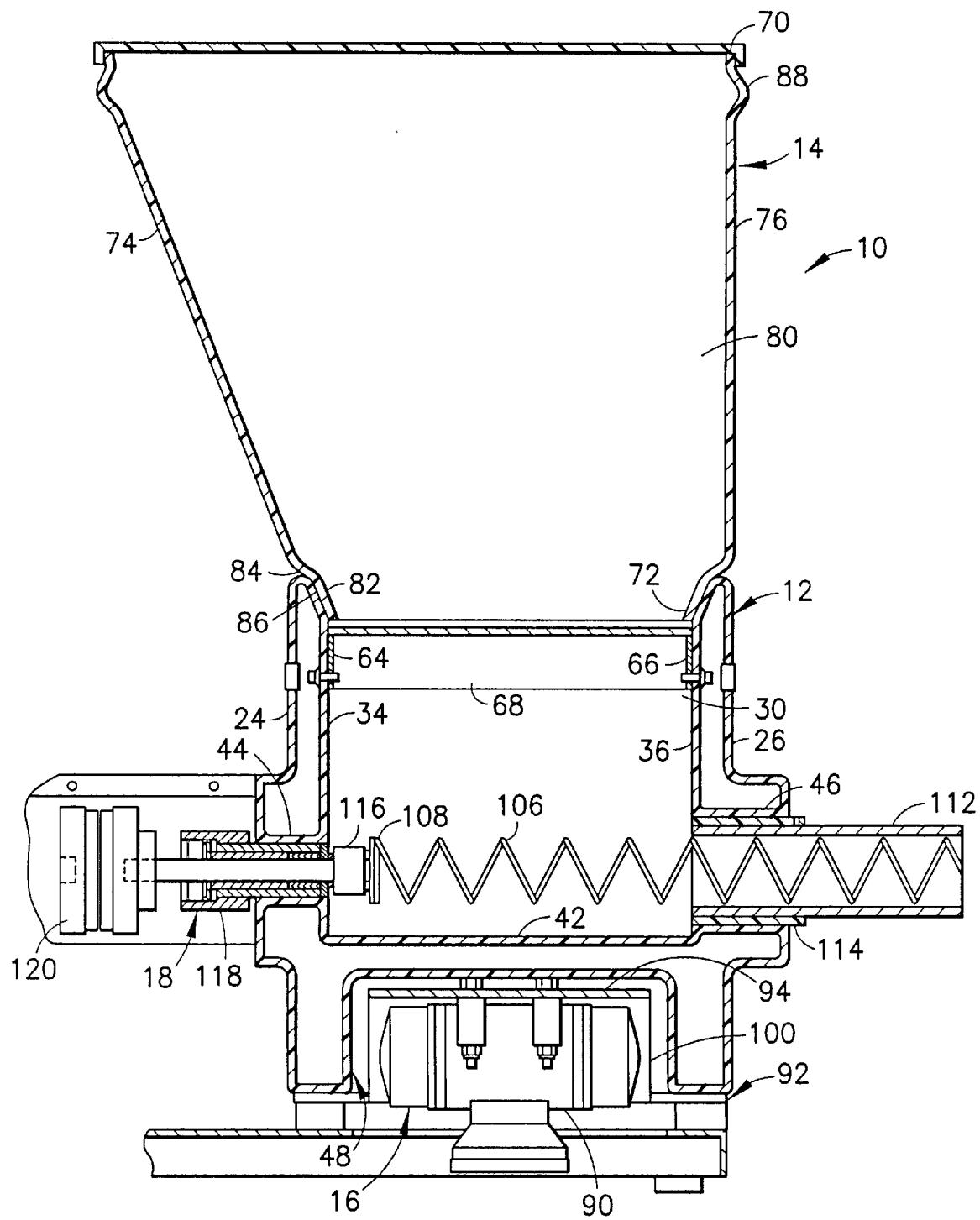
FIG. 3 is a cross-sectional view taken along line 3—3 in FIG. 2.

A vibratory feed apparatus in accordance with the subject invention is identified generally by the numeral 10 in FIGS. 1–3. The apparatus 10 includes a trough 12, a hopper 14, a vibratory assembly 16 and a screw feed assembly 18.

Figure 4:
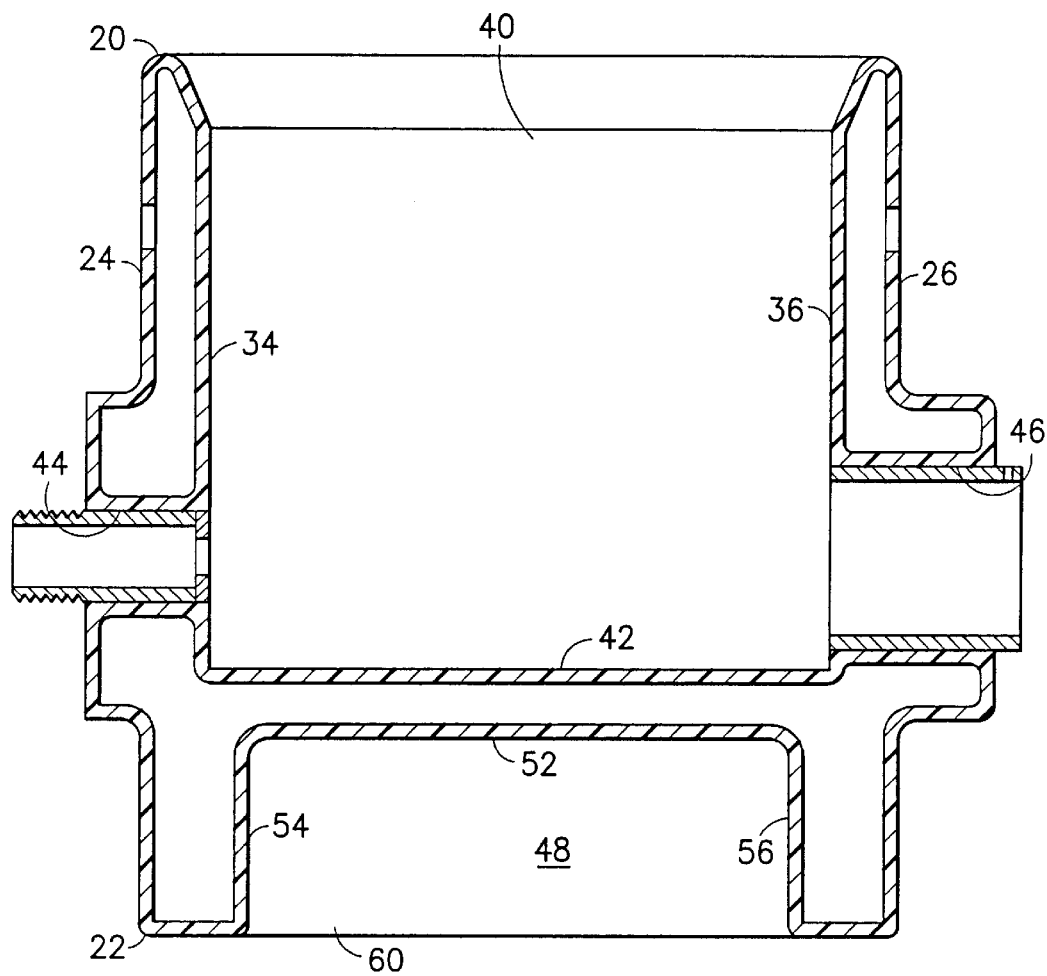
FIG. 4 is a cross-sectional view similar to FIG. 3, but showing only the trough of the subject invention.
Figure 5:
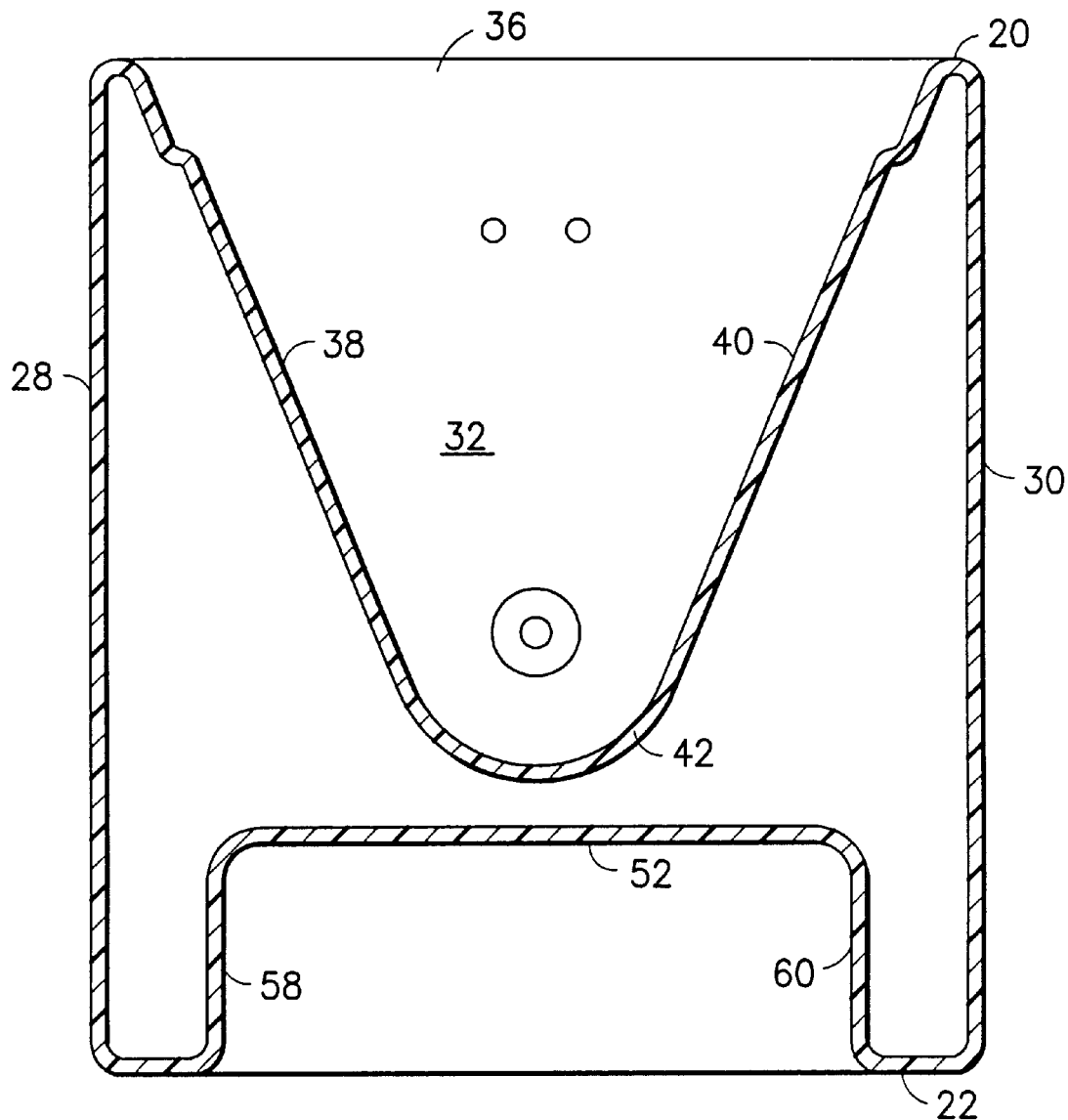
FIG. 5 is a cross-sectional view taken along line 5—5 in FIG. 4.

The trough 12 of the apparatus 10 is unitarily molded from a plastic material, such as polyethylene, to define a double wall construction, as shown most clearly in FIGS. 4 and 5. The trough 12 includes a top 20 for connection to the hopper 14 and a bottom 22 for secure mounting to a base 23 as explained further herein. The base 23 includes a scale for loss-in-weight batch feeding operations, as explained above. External portions of the trough 12 between the top 20 and the bottom 22 are substantially rectilinear. In particular, the trough 12 includes substantially parallel first and second outer end walls 24 and 26 and first and second substantial parallel outer side walls 28 and 30. The outer end walls 24 and 26 are substantially orthogonal to the outer side walls 28 and 30. Additionally, the outer end walls 24 and 26 and the outer side walls 28 and 30 extend substantially continuously from the top 20 to the bottom 22 of the trough 12.

The trough 12 further includes an open-topped upper recess 32 extending into the top 20 thereof. The upper recess 32 is defined by first and second inner end walls 34 and 36, first and second inner side walls 38 and 40 and a cylindrically curved bottom wall 42. The first and second inner end walls 34 and 36 are substantially parallel to one another and substantially parallel to the outer end walls 24 and 26. However, portions of the first and second inner end walls 34 and 36 adjacent the top 20 of the trough 12 are flared outwardly and join with the respective first and second outer end walls 24 and 26 at the top 20 of the trough 12. As a result, the first and second inner end walls 34 and 36 are disposed in spaced relationship to the respective first and second outer end walls 24 and 26 at all locations except the extreme top 20 of the trough 12. The bottom wall 42 is disposed between the top 20 and the bottom 22 of the trough 12 and is cylindrically generated about an axis parallel to and centrally between the outer side walls 28 and 30. The first and second inner side walls 38 and 40 extend substantially tangentially from the bottom wall 42 and diverge from one another toward the top 20 of the trough 12. Portions of the side walls 38 and 40 adjacent the top 20 define steps for receiving the hopper 14 as explained herein. As shown most clearly in FIG. 5, the first and second inner side walls 38 and 40 are spaced from the respective first and second outer side walls 28 and 30 at all locations except the extreme top 20 of the trough 12.

The trough 12 include a cylindrical drive support wall 44 extending from the first outer end wall 24 to the first inner end wall 34. The cylindrical drive support wall 44 is generated about an axis that extends substantially parallel to the top and bottom 20 and 22 of the trough 12 and substantially centrally between the outer side wall 28 and 30. The cylindrical drive support 44 provides communication from external regions of the trough 12 into the recess 32. The trough 12 further includes a cylindrical outlet support wall 46 that extends between the second outer end wall 26 and the second inner end wall 36. The cylindrical outlet support wall 46 is generated about an axis coincident with the axis of the cylindrical drive support wall 44. As shown most clearly in FIG. 5, portions of the first and second outer end walls 24 and 26 near the cylindrical walls 44 and 46 project outwardly to provide lengths for the cylindrical walls 44 and 46 that are sufficient to ensure adequate support for a drive rod and a discharge tube as explained below.

The bottom 22 of the trough 12 is characterized by a generally rectangular lower recess 48. The lower recess 48 includes a top wall 52 that extends substantially parallel to the top and bottom 20 and 22 of the trough 12 and in spaced relationship to the cylindrically generated bottom wall 42 of the open-topped upper recess 32. The lower recess 48 is further characterized by first and second bottom end walls 54 and 56 and first and second bottom side walls 58 and 60. The lower recess 48 accommodates the vibrator assembly 16 as explained further herein.

As shown most clearly in FIG. 4, a plurality of mounting apertures 62 extend into the bottom 22 at locations intermediate the outer walls 24, 26, 28 and 30 and the lower recess 48. The mounting apertures enable mounting of the apparatus 10 to the base 23 as explained further below.

The trough 12 further includes baffle supports 64 and 66 mounted to the first and second inner end walls 34 and 36 respectively at locations near the outwardly flare approaching the top of the trough 12. A baffle 68 of inverted V-shaped cross-section extends between the first and second inner end walls 34 and 36 in supporting engagement on the respective baffle supports 64 and 66.

The hopper 14 includes an open top 70 and an open bottom 72. Portions of the hopper 14 between the top and bottom 70 and 72 include first and second end walls 74 and 76 and first and second side walls 78 and 80. The side walls 78 and 80 are substantially parallel to one another and substantially orthogonal to the end wall 74 and 76. Additionally, the side walls 78 and 80 and the second end walls 76 extend substantially orthogonal to the top and bottom 70 and 72 of the hopper 14. However, the first end wall 74 is angularly aligned to the second end wall 76 such that the top 70 of the hopper 14 defines a larger area than the bottom 72 thereof. Regions of the hopper 14 adjacent the bottom 72 thereof are offset inwardly to define a mounting portion 82. The mounting portion 82 terminates at a step 84. The mounting portion 82 is configured and dimensioned to nest with the outwardly flared surfaces on the inner walls 34, 36, 38 and 40 adjacent the top 20 of the trough 12. The step 84 defines a limit to this telescoped nested engagement of the hopper 14 with the trough 12 and further substantially prevents leakage of powdered material from the interface of the trough 12 and hopper 14. Leakage is further prevented by a gasket 86 disposed at the interface of the trough 12 and hopper 14. Portions of the hopper 14 adjacent the top 70 thereof are characterized by an outward corrugation 88 extending entirely around the hopper. The corrugation 88 attributes to rigidity of the hopper 14.

The vibrator assembly 16 includes a vibrator 90 having an eccentric axis of rotation aligned substantially parallel to the axes about which the cylindrical walls 44 and 46 are generated. The vibrator assembly 16 further includes a steel mounting bracket 92. The mounting bracket 92 is of generally U-shape and includes a generally planar top wall 94, first and second side walls 98 and 100 and first and second mounting flanges 102 and 104 respectively. The mounting flanges 102 and 104 are disposed adjacent the bottom 22 of the trough 12 and include apertures that align with the apertures 62 in the bottom 22 of the trough 12. Thus, the mounting bracket 92 can be securely affixed between the bottom 22 of the trough 12 and the base 23. The vibrator 90 is securely connected to the top wall 94 of the mounting bracket 92 by a plurality of bolts as shown in FIGS. 2 and 3. Vibrations from the vibrator 90 are transmitted through the top wall 94 of the mounting bracket 92 and into the mounting flanges 102 and 104. In this manner, vibrations are further transmitted into the double-walled trough 12 and portions of the hopper 14 adjacent the bottom end 72 thereof.

The screw feed assembly 18 of the apparatus 10 includes a helically generated screw 106 extending substantially coaxially with the cylindrical walls 44 and 46 of the trough 12. The screw 106 include opposed ends 108 and 110. Portions of the screw 106 adjacent the end 110 extend centrally through a feed tube 112. The feed tube 112 is mounted in a cylindrical bushing 114 which is closely engaged in the cylindrical outlet support wall 46 of the trough 12. Particulate material in the open-topped upper recess 32 of the trough 12 will be delivered by the screw 106 through the feed tube 112 and into an external receptacle (not shown).

Figure 6:
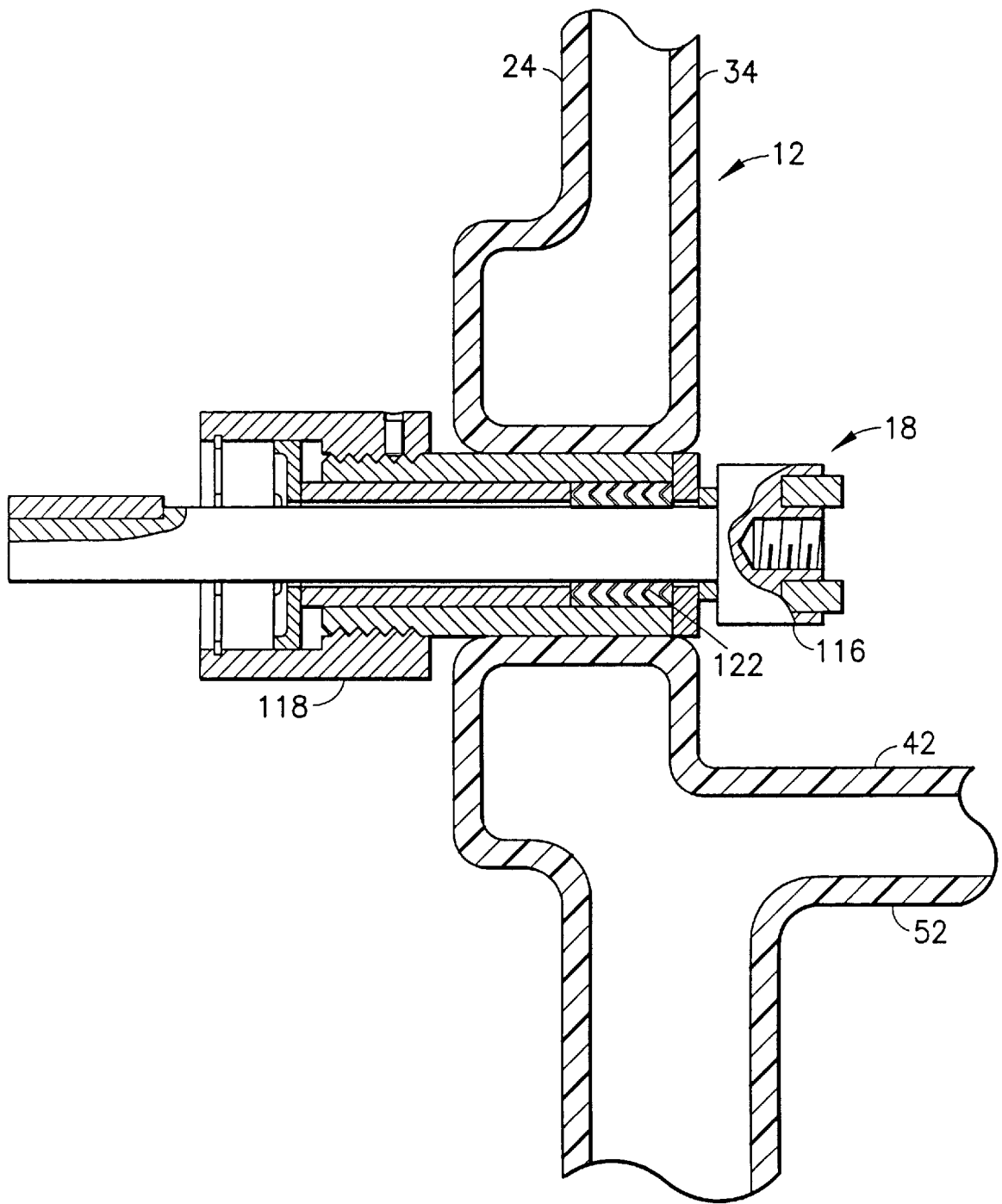
FIG. 6 is a cross-sectional view of the rear seal assembly.

The first end 108 of the screw 106 is removably mounted to a drive shaft 116. The drive shaft 116 extends through a seal assembly 118 which is mounted in the cylindrical drive support wall 44 of the trough 12. Portions of the drive shaft 116 externally of the trough 12 and externally of the seal 18 are rotatably driven by a motor 120. Rotation of the drive shaft 116 will cause the screw 106 to rotate about its axis and to deliver powdered or particulate material from the open-topped upper recess 32 in the trough 12 through the feed tube 112. Continued operation of the apparatus 10 invariably will cause wear of components within the seal 118. As a result, the seal 118 preferably includes a plurality of V-rings that are biased against the drive shaft 116. The seal 118 can be tightened, by, for example, threaded elements therein to urge the V-rings 122 toward one another, thereby biasing the V-rings both inwardly and outwardly into tighter sealing engagement against the drive shaft 116. Other seals may be employed in place of the seal 118, such as seals that do not employ the plurality of V-rings shown in FIG. 6.

In use, a feed tube 112 and a screw 106 for a particular application are selected and are mounted in the cylindrical outlet wall 46 of the trough 12. Feed screws 106 of a smaller diameter will be used with a feed tube 112 of a comparably smaller diameter. In these instances, however, the inside diameter of the bearing 114 will be larger, and the radial thickness of the bearing 114 will be greater to ensure proper support and sealing around the feed tube 112.

The apparatus 10 is used by feeding particulate material into the open top 70 of the hopper 14 while simultaneously activating the vibrator 90 and the motor 120 for driving the screw 106. Vibrations generated by the vibrator 90 are transmitted through the mounting bracket 92 into the double-walled trough 12 and to the vicinity of the bottom end 72 of the hopper 14 and the baffle 68 in the trough 12. These vibrations are transmitted efficiently through the double walled trough 12 to ensure a continuous flow of particulate material on either side of the baffle 68 and into the open-topped upper recess 32 in the trough 12. Particulates then flowing gravitationally toward the bottom wall 42 of the open-topped upper recess 32 in the trough 12 are carried by the screw 106 through the feed tube 112. The mounting bracket 92 has been found to be an efficient transmitter of the vibrations. Additionally, the plastic of both the trough 12 and the hopper 14 have been found to exhibit a quite operation due to the nature of the plastics, and due to the double walled configuration of the upper and lower recesses 32 and 48 of the trough 12. Additionally, the double walled configuration of the trough 12, combined with the outward flare of the outer end walls 24 and 26 near the screw 106 provides effective support for both the feed tube and the drive shaft and their respective seals.

While the invention has been described with respect to a preferred embodiment, it is apparent that various changes can be made without departing from the scope of the invention as defined by the appended claims.

We claim:

1. A vibratory feed apparatus for feeding particulate materials, said apparatus comprising:
   a trough molded from plastic and including a top and a bottom, a plurality of outer walls extending from the top to the bottom, a plurality of inner walls extending from the top toward the bottom in spaced relationship to the outer walls and defining an open-topped upper recess, first and second coaxially aligned cylindrical walls extending through the trough into the open-topped upper recess at locations spaced from the top of the trough;
   a plastic hopper removably mounted to the top of the trough for delivering particulate material into the upper recess of the trough;
   a vibrator mounted to the trough for delivering vibrations to the inner and outer walls of the trough; and
   a screw feed assembly including a drive shaft extending through the first cylindrical wall in the trough and a helically generated screw extending from the drive shaft through the second cylindrical wall.

2. The apparatus of claim 1, wherein the trough is unitarily molded from plastic.

3. The apparatus of claim 2, wherein the plastic of the trough and the hopper is polyethylene.

4. The apparatus of claim 1, wherein the trough further includes a lower recess extending into the bottom of the trough toward the upper recess, the vibrator being mounted in the lower recess.

5. The apparatus of claim 4, further comprising a vibrator bracket disposed in the lower recess, portions of said bracket being securely mounted to said trough, said vibrator being securely mounted to the bracket, such that vibrations from the vibrator are transmitted through the bracket to the trough and to the hopper.

6. The apparatus of claim 5, wherein the bracket is of substantially U-shape and is unitarily formed from a metallic material, the bracket comprising a top wall aligned substantially parallel to the bottom of the trough and having the vibrator securely mounted thereto, the bracket further including first and second side walls extending downwardly from the top wall and a plurality of flanges extending from the side walls and securely connected to the bottom of the trough.

7. The apparatus of claim 1, wherein the outer walls of the trough project outwardly in proximity to the cylindrical walls distances selected to provide cylindrical walls of sufficient length for supporting portions of said screw assembly.

8. The apparatus of claim 7, further comprising a cylindrical feed tube surrounding portions of said screw, a cylindrical bearing engaged around portions of said feed tube, said bearing including an outer cylindrical surface securely engaged in one of said cylindrical walls of said trough.

9. The apparatus of claim 7, wherein the screw feed assembly includes a drive shaft removably mounted to one end of said screw, a seal surrounding portions of said drive shaft and mounted in one of said cylindrical walls of said trough, portions of said seal being adjustable to prevent leakage of particulate material after wear of said seal.

10. The apparatus of claim 1, wherein portions of said inner walls of said trough adjacent the top of said trough are flared outwardly, and wherein portions of said hopper adjacent the bottom end thereof are tapered inwardly for tight nested engagement with the outwardly flared portions of the inner walls of the trough.

11. The apparatus of claim 10, further comprising a gasket between the trough and the hopper.

12. The apparatus of claim 10, further comprising a generally V-shaped baffle mounted in portions of said open-topped upper recess adjacent the outwardly flared portions of said inner walls of the trough.

13. The apparatus of claim 12, further comprising a plurality of baffle mounts secured to said inner walls of said trough, said baffle being secured on said baffle mounts.

14. The apparatus of claim 13, wherein said outer walls are provided with access openings for accessing regions of said inner walls to which said baffle mounts are secured, said access openings providing access for removably attaching said baffle mounts to said inner walls.

15. A vibratory feed apparatus for feeding particulate materials, said apparatus comprising:
   a trough unitarily molded from plastic and including a top and a bottom, a plurality of outer walls extending from the top to the bottom, a plurality of inner walls extending from the top toward the bottom in spaced relationship to the outer walls and defining an open-topped upper recess, first and second coaxially aligned cylindrical walls extending through the trough into the open-topped upper recess at locations spaced from the top of the trough, a lower recess being formed in the bottom of the trough by a plurality of bottom inner walls spaced from said outer walls and from said upper recess;
   an inverted V-shaped baffle securely mounted in the upper recess of the trough between the top of the trough and the cylindrical walls through the trough;
   a single-walled plastic hopper removably mounted to the top of the trough for delivering particulate material into the upper recess of the trough;
   a vibrator assembly mounted in the lower recess of the trough, said vibrator assembly including a steel vibrator bracket secured to said bottom of said trough and extending across said lower recess and a vibrator for delivering vibrations through the vibrator bracket and to the trough and the hopper; and
   a screw feed assembly including a drive shaft extending through the first cylindrical wall in the trough and a helical screw extending from the drive shaft through the second cylindrical wall, a feed tube mounted in the second cylindrical wall and surrounding portions of the screw, a seal surrounding the drive shaft and securely mounted to the first cylindrical wall of the trough, said seal being adjustable for preventing leakage of particulate material adjacent said drive shaft.

* * * * *